US004001642B2

United States Statutory Invention Registration [19]

[11] Reg. Number: H1642

Jenkins

[45] Published: Apr. 1, 1997

[54] WEAR AND IMPACT TOLERANT PLOW BLADE

[75] Inventor: James F. Jenkins, Ventura, Calif.

[73] Assignee: The United States of America as represented by the Secretary of the Navy, Washington, D.C.

[21] Appl. No.: 405,750

[22] Filed: Mar. 20, 1995

[51] Int. Cl.[6] ..... F16L 1/12

[52] U.S. Cl. ..... 405/159; 37/367; 37/370; 172/699

[58] Field of Search ..... 37/337, 367, 370, 37/142.5; 172/699, 701.1, 701.2, 701.3; 405/158, 159, 160, 161, 162, 163

[56] References Cited

U.S. PATENT DOCUMENTS

| | | | |
|---|---|---|---|
| 3,934,654 | 1/1996 | Stephenson et al. | 172/701.3 |
| 4,086,966 | 5/1978 | Lanz et al. | 172/701.3 |
| 4,715,450 | 12/1987 | Hallissy et al. | 172/701.3 |
| 4,812,079 | 3/1989 | Johnson et al. | 405/163 X |
| 4,844,658 | 7/1989 | Kohn | 405/159 |
| 5,427,186 | 6/1995 | Adrian et al. | 172/701.3 |

*Primary Examiner*—Michael J. Carone
*Assistant Examiner*—Christopher K. Montgomery
*Attorney, Agent, or Firm*—Melvin J. Sliwka; Ron Billi; David S. Kalmbaugh

[57] ABSTRACT

A wear resistant and impact tolerant plow blade comprising a plurality of alternate layers of wear resistant and impact resistant materials. Each layer extends from the leading edges of the plow blade rearwardly and is fabricated of a homogeneous material. Each layer has substantially parallel sides and abuts an adjacent layer or layers to form a substantially seamless plow.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WEAR AND IMPACT TOLERANT PLOW BLADE

BACKGROUND

The present invention relates to marine plow blades that cut a trench in the sea floor for simultaneous cable emplacement. More specifically, but without limitation, the present invention relates to an undersea plow blade for cutting a trench in the sea floor when pulled by a ship on the sea surface. A cable is emplaced (i.e. laid) simultaneously in the cut trench.

It is oftentimes desirable to bury undersea cables below the sea floor to reduce cable damage due to fishing activities, marine animals, natural hazards such as erosion and turbidity currents and other damaging effects. Ocean communications cables are typically emplaced over long distances of up to 200 miles or more and at depths of several thousand feet or more. Power cables are generally of shorter runs but may be placed at similar depths. The cable emplacement operation requires careful coordination of, for example, the plow blade, towing ship and cable since all three must be manipulated simultaneously to make the operation successful. If the operation must be halted to repair or replace a defective component, it is usually extremely difficult to resume the cable emplacement operation in the same place. This is due to both the dynamic nature of the operation and the depths that the cable is laid. It is therefore desirable to be able to lay cable without interruption over distances of up to 200 miles or more and at depths of several thousand feet or more. A major source of cable emplacement interruption is repair or replacement of the plow blade. In operation, the plow blade is pulled through the soil subjecting the leading edge of the plow blade and the adjacent sides thereof, to both severe wear and impact. Wear is caused by high pressure contact between the plow blade and saturated frictional soils while damage due to impact is caused by contact with rocks and other solid objects. Under these conditions, a plow blade can be quickly damaged.

Attempts have been made to increase the useful life of marine plow blades by increasing the wear resistance of the blade. This has commonly been done by making an entire blade uniform (see FIG. 2) from wear resistant (ie. hard) material such as tungsten carbide or silicon carbide, for example. While providing resistance to abrasion, blades of this type do not provide sufficient toughness to resist impacts and the blades fail.

Attempts have also been made to increase the toughness of marine plow blades by applying wear resistant, hard-facing material over a tough material. The hard-facing "overlay" is typically applied via weld overlays or implantation of small particles of hard material onto the leading edges of a plow blade (see FIG. 2). These two-stage blades resist total fracture by impact loading but as soon as the leading edge material is damaged and/or worn away, the tough material is exposed and soon fails due to abrasion. Total failure of the plow blade soon follows.

It is thus desirable to provide a marine plow blade that has both the wear resistant characteristics of hard materials and the impact resistant characteristics of tough materials.

SUMMARY

Accordingly, the preferred embodiment of the present invention provides a marine plow blade having the characteristics of both wear resistance and toughness. The marine plow blade of the present invention includes a plurality of alternating rows (ie. layers) of wear resistant material and tough material. Each row or layer extends from the leading edge of the plow blade rearwardly and is fabricated of a homogenous material. Each layer has substantially parallel sides and abuts an adjacent layer or layers to form a substantially seamless plow blade.

DETAILED DESCRIPTION

Figure 1:
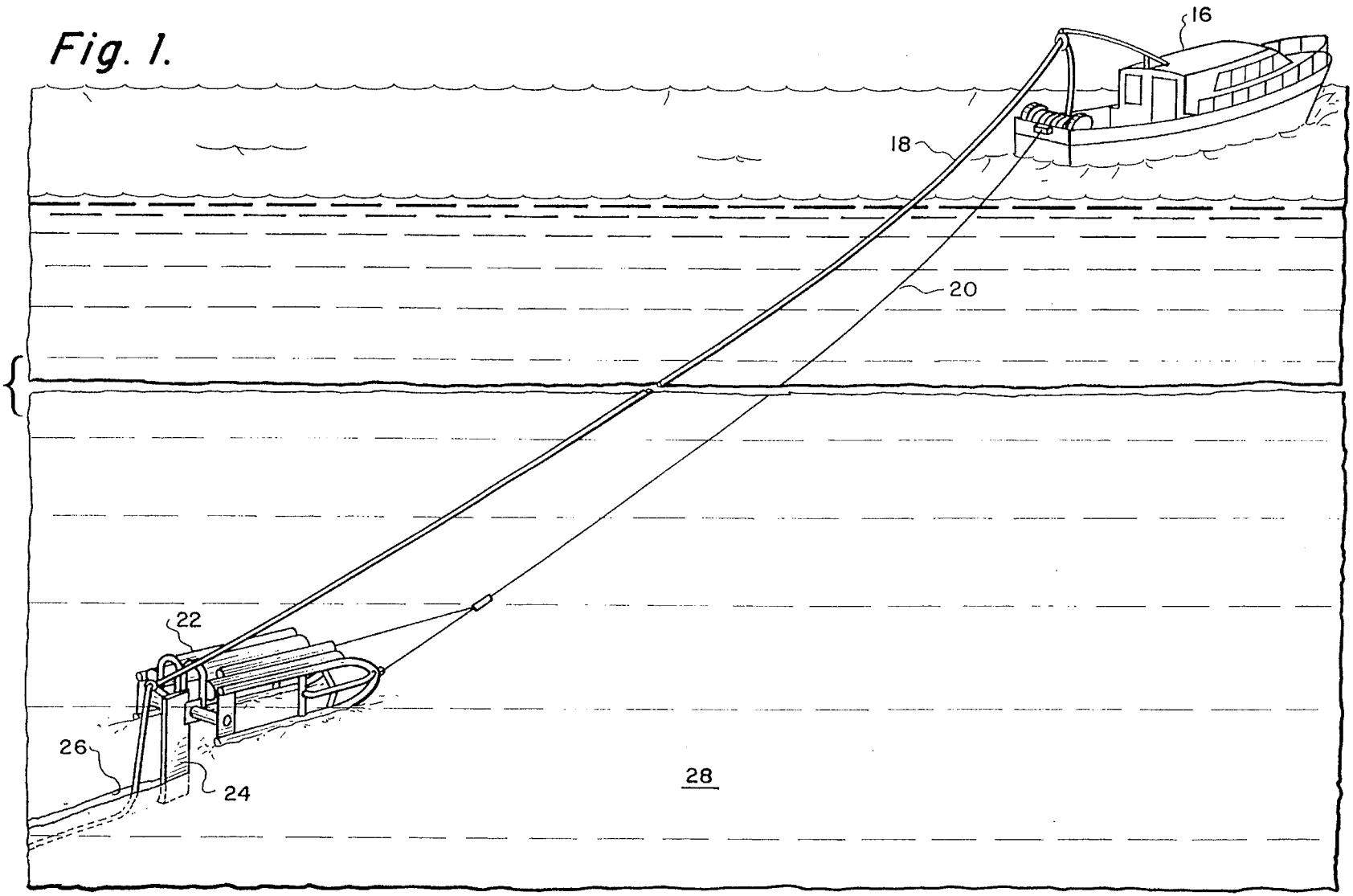
FIG. 1 is a perspective view of a typical cable laying operation showing a ship towing a sled and plow blade and cutting a trench in the sea floor while simultaneously emplacing a cable in the trench.
Figure 2:
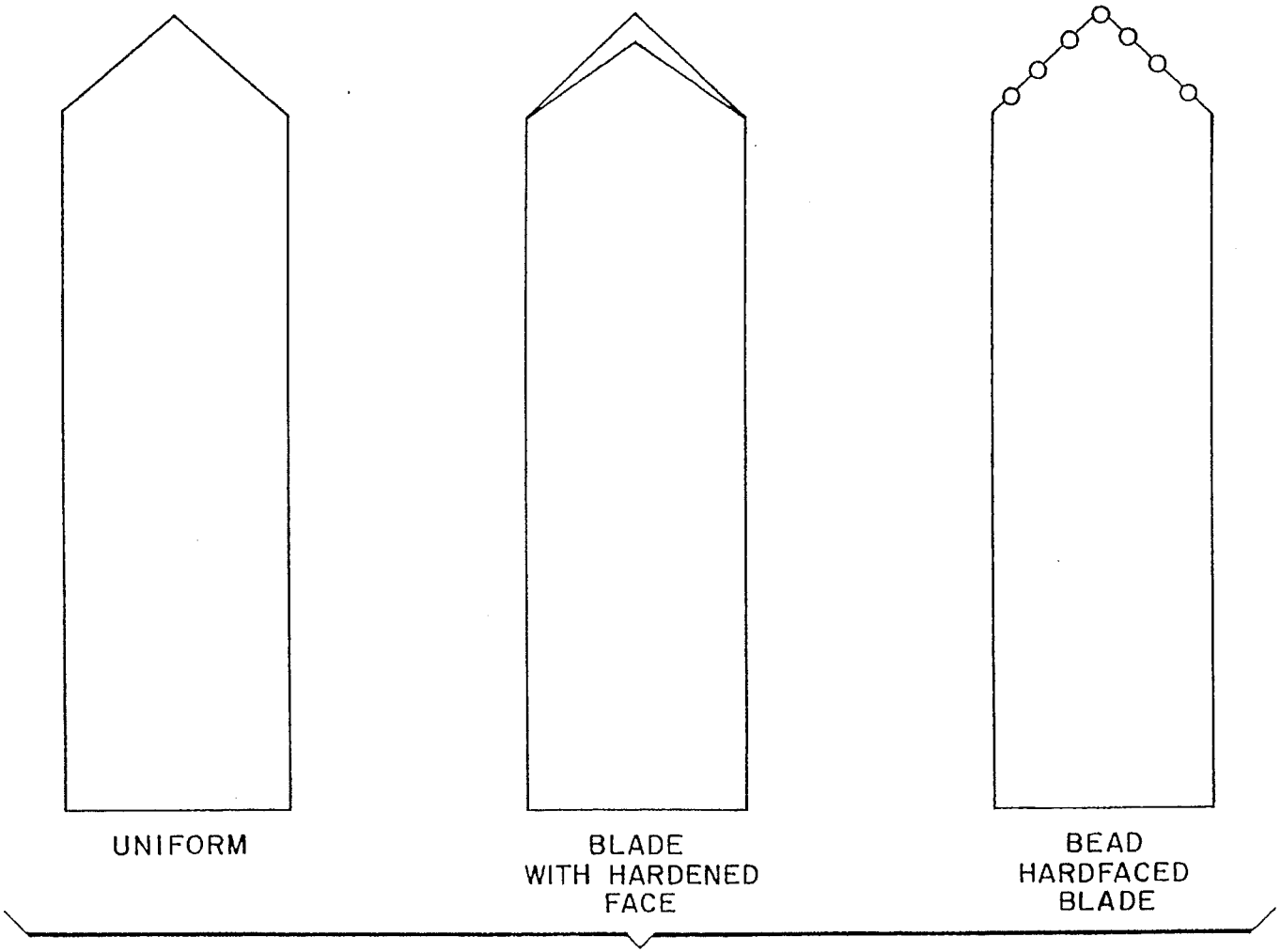
FIG. 2 is a top view in x-section of a typical uniform plow blade and of two-stage blades.

The present invention is illustrated by way of example in FIGS. 1–4. FIG. 1 shows a typical ship 16 towing sled 22 via tow line 20. As can be seen, plow blade 2 is attached to sled 22 and cuts trench 26 in sea floor 28 as sled 22 is towed. Cable 18 is simultaneously emplaced as trench 26 is cut.

Figure 4:
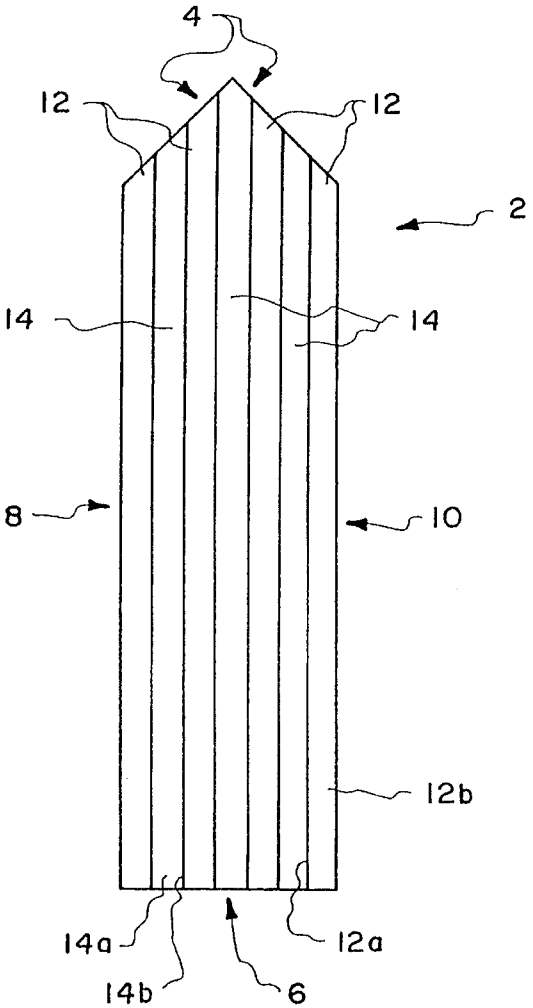
FIG. 4 is a top view in x-section of the preferred embodiment of the present invention showing the arrangement of the alternating layers.

The preferred embodiment of plow blade 2 is shown in FIG. 4. As shown in FIG. 4, plow blade 2 includes leading edge 4, rear edge 6 and sides 8 and 10. The preferred embodiment of plow blade 2 is approximately 12–18" tall, 9" deep and 0.5" thick. The leading edge 4 subtends an arc of approximately 100 degrees. These dimensions are particularly well suited to emplacing, for example, a fiber optic cable of less than 1" diameter at soil depths of 6–12". It will of course be understood by those skilled in the art that these dimensions may be varied to obtain other desirable results for emplacement of different size cables at the same or different depths. As shown in FIG. 4, plow blade 2 includes a plurality of layers 12 and 14 arranged in an alternating fashion. Each layer 12 includes sides 12*a* and 12*b* and each layer 14 includes sides 14*a* and 14*b*. Sides 12*a*, 12*b*, 14*a* and 14*b* are substantially parallel when attached as shown in FIG. 4. It should be noted that sides 8 and 10 refer to the outermost sides of plowblade 2 and are used when referring to the plowblade as a whole. Sides 12*a*, 12*b*, 14*a* and 14*b* refer to the sides of the layers 12 and 14 and are used when refering to the layers themselves. Thus, side 8 of plowblade 2 may be either a 12*a* side or a 14*a* side depending on the material chosen for the outermost position on side 8. Likewise, side 10 may be either a 12*b* side or a 14*b* side depending on the material choosen for the outermost position on side 10. It should also be understood that different thicknesses of layers 12 and different thicknesses of layers 14 may be used within a given plow blade. Layers 12 are "tough" material and layers 14 are "hard" material. Suitable and preferred "tough" materials may be, for example, AISI 4340 steel or ASTM A-514 steel. A suitable and preferred "hard" materials may be, for example, tungsten carbide or silicon carbide. Other materials may be used.

Figure 3:
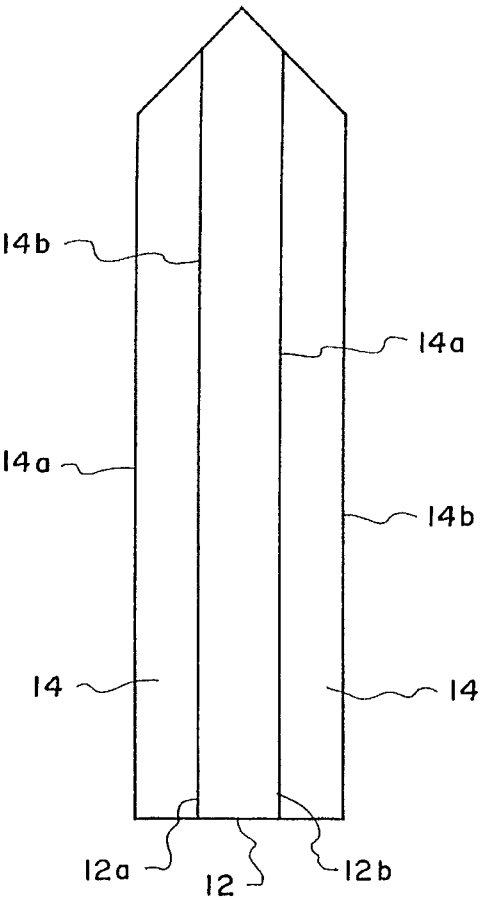
FIG. 3 is a top view of an alternate embodiment of the present invention showing a single wear resistant layer and two tough layers on either side.

An alternate embodiment of the present invention is shown in FIG. 3. A single tough layer 12 is shown between two hard layers 14. Leading edge 4 subtends an angle of approximately 110 degrees. Plow blade 2 includes side 8, side 10 and rear edge 6. Sides 12*a*, 12*b*, 14*a* and 14*b* are substantially parallel. Suitable and preferred materials are as specified above for the preferred embodiment of FIG. 4. Other materials may be used.

Obviously many modifications and variations of the present invention are possible in light of the above teachings. It is therefore to be understood that within the scope of the appended claims, the invention may be practiced otherwise than as specifically described.

What is claimed is:

1. A marine plow blade for cutting a trench in the ocean of floors and having a leading edge comprising:

a) a plurality of first homogenous layers extending from the leading edge of the plow blade rearwardly, the first homogenous layers having abrasion resistant characteristics;

b) a plurality of second homogenous layers extending from said leading edge of said plow blade rearwardly, the second homogenous layers having impact resistant characteristics, said first homogenous layers and said second homogenous layers alternatingly positioned across said leading edge of said plow blade.

2. The marine plow blade defined in claim 1, wherein said first homogenous layers are silicon carbide and said second homogenous layers are AISI 4340 steel.

3. The marine plow blade defined in claim 1, wherein said first homogenous layers are tungsten carbide and said second homogenous layers are AISI 4340.

4. A marine plow blade having a leading edge, a rear edge and two sides, the marine plow blade comprising:

a) a first layer of abrasion resistant material extending from the leading edge of said marine plow blade rearwardly; and b) a second layer of impact resistant material located on each side of said first layer and attached to said first layer, the second layers extending from said leading edge of said marine plow blade rearwardly.

* * * * *